United States Patent [19]

Frank

[11] Patent Number: 4,598,611
[45] Date of Patent: * Jul. 8, 1986

[54] LOW POWER CONTROL SYSTEM AND METHOD FOR A POWER DELIVERY SYSTEM HAVING A CONTINUOUSLY VARIABLE RATIO TRANSMISSION

[75] Inventor: Andrew A. Frank, Madison, Wis.

[73] Assignee: Aisin Seiki Kabushiki Kaisha, Kariya, Japan

[*] Notice: The portion of the term of this patent subsequent to Jul. 17, 2001 has been disclaimed.

[21] Appl. No.: 614,755

[22] Filed: May 29, 1984

Related U.S. Application Data

[63] Continuation-in-part of Ser. No. 380,922, May 21, 1982, Pat. No. 4,459,878.

[51] Int. Cl.[4] .................. B60K 41/18; B60K 41/12
[52] U.S. Cl. .............................. 74/860; 74/859; 74/866; 123/339; 123/333
[58] Field of Search .............. 74/866, 860, 877, 859, 74/857; 123/339, 333, 436; 364/424.1

[56] References Cited

U.S. PATENT DOCUMENTS

| Re. 24,347 | 6/1955 | Miner . | |
|---|---|---|---|
| 2,131,157 | 9/1938 | Almen et al. . | |
| 2,842,108 | 7/1958 | Sanders | 123/436 |
| 3,008,341 | 11/1961 | Cobb . | |
| 3,044,316 | 7/1962 | Forster . | |
| 3,256,747 | 6/1966 | Kempson . | |
| 3,368,426 | 2/1968 | Karig et al. . | |

(List continued on next page.)

FOREIGN PATENT DOCUMENTS 2062290  5/1981  United Kingdom .

OTHER PUBLICATIONS

Stubbs, P. W. R., The Development of a Perbury Traction Transmission for Motor Car Applications, 8/80.
Beachley, N. H., Principles and Definitions for Continuously Variable Transmissions, with Emphasis on Automotive Applications, 8/80.
Porsche Features Engine and Driveline Efficiency, *Automotive Engineering*, 1/1982.
Raynard, A. E., et al., Design Study of Toroidal Traction CVT for Electric Vehicles, 1/1980.
Oliver, L. R., Design Equations for a Speed and Torque Controlled Variable Ratio V-Belt Transmission, 6/1980.
Ironside, John M., Continuously Variable Transmission Control, ©1980.

*Primary Examiner*—Kenneth J. Dorner
*Assistant Examiner*—Dirk Wright
*Attorney, Agent, or Firm*—Banner, Birch, McKie & Beckett

[57] ABSTRACT

A control system and method for a power delivery system, such as that of an automotive vehicle, having an engine coupled to a continuously variable ratio transmission (CVT). Independent control of engine and transmission enable the engine to precisely follow a desired operating characteristic, such as the ideal operating line for low fuel consumption. Engine fuel requirements (e.g., throttle position) are a function of at least measured engine speed, and are adjusted in accordance with any load placed on the engine so that, during low power operation, fuel flow is increased when a decrease in operating speed occurs, and fuel flow is reduced when an increase in operating speed occurs. The speed of the engine is therefore regulated in accordance with the load placed thereon. Reduction of transmission ratio effects vehicle acceleration in this mode, while an increase in transmission ratio effects vehicle deceleration.

Where a clutch or other type of variable engagement coupling is employed, the engine still is independently regulated in accordance with the fuel function even when the clutch is slipping. During the clutch slipping phase, the transmission preferably is held at a substantially constant high reduction ratio, while vehicle acceleration and deceleration are effected simply by varying the degree of engagement of the clutch.

104 Claims, 12 Drawing Figures

U.S. PATENT DOCUMENTS

| | | |
|---|---|---|
| 3,552,232 | 1/1971 | Kress . |
| 3,616,706 | 11/1971 | Shimamoto . |
| 4,008,567 | 2/1977 | Hirsch . |
| 4,023,442 | 5/1977 | Woods et al. . |
| 4,082,013 | 4/1978 | Dornfeld et al. ............... 74/866 |
| 4,091,690 | 5/1978 | Miyao . |
| 4,107,776 | 8/1978 | Beale . |
| 4,152,947 | 5/1979 | van Deursen et al. . |
| 4,161,894 | 7/1979 | Giacosa . |
| 4,219,000 | 8/1980 | Locher et al. ............... 123/333 X |
| 4,220,059 | 9/1980 | Mizuno et al. . |
| 4,229,998 | 10/1980 | Mizuno et al. . |
| 4,241,618 | 12/1980 | Smirl . |
| 4,246,807 | 1/1981 | Kofink . |
| 4,253,347 | 3/1981 | Mizuno et al. . |
| 4,281,567 | 8/1981 | Maurer . |
| 4,368,653 | 1/1983 | Mizuno et al. . |
| 4,371,050 | 2/1983 | Ikeura . |
| 4,381,684 | 5/1983 | Himmelstein . |
| 4,383,456 | 5/1983 | Ganoung . |
| 4,389,910 | 6/1983 | Lockhart . |
| 4,428,257 | 1/1984 | Meyerle et al. . |
| 4,428,341 | 1/1984 | Hassler et al. . |
| 4,438,664 | 3/1984 | Fiala . |
| 4,445,603 | 5/1984 | Filsinger . |
| 4,458,560 | 7/1984 | Frank et al. ............... 74/857 |
| 4,459,878 | 7/1984 | Frank ............... 74/857 |
| 4,492,195 | 1/1985 | Takahashi et al. ............... 123/339 |
| 4,515,041 | 5/1985 | Frank et al. ............... 74/866 |
| 4,524,739 | 6/1985 | Kashiwaya et al. ............... 123/339 |

$h(\theta)$

SHEAVE ACTUATING CURVES

LOW POWER CONTROL SYSTEM AND METHOD FOR A POWER DELIVERY SYSTEM HAVING A CONTINUOUSLY VARIABLE RATIO TRANSMISSION

This application is a continuation-in-part of my copending application Ser. No. 380,922, filed May 21, 1982 (now U.S. Pat. No. 4,459,878).

BACKGROUND OF THE INVENTION

This invention relates to a power delivery system having a continuously variable ratio transmission and, more particularly, to a control system and a control method for such a system, such as might be used in an automotive vehicle.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsion force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter cruising.

Many different CVT configurations have been developed in the prior art. These include, for example, hydrostatic transmissions; rolling contact traction drives; overrunning clutch designs; electrics; multispeed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in 1 b.M/BHP-hr. Minimum fuel consumption occurs at a point designated by 0.4 pounds per horsepower-hour. The series of dashed lines indicates power output of the engine. An ideal operating line, for example, for low fuel consumption, is indicated by the heavy solid line $f(N_E)$, this curve being a function of engine speed. This ideal operating line is purely a function of engine characteristics and is optimal regardless of vehicle road speed. Other ideal operating lines may appear on the performance map, for example, an ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along an ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line.

In virtually all prior art engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating time. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most proir art control systems cannot compensate for varying engine conditions, the result being vehicle driveability which varies with engine temperature, state of tune, age and altitude. Close duplication of conventional vehicle characteristics also is a problem with prior art CVT control schemes.

My copending U.S. application Ser. No. 380,992, filed May 21, 1982 (now U.S. Pat. No. 4,459,878)—which is incorporated herein by reference—discloses an elegant solution to the above-noted problems inherent in prior art engine-CVT control systems. Briefly, the control scheme disclosed therein involves totally independent engine and transmission control. That is, the position of the engine throttle is totally independent of accelerator pedal position. Throttle position and, hence, engine output torque simply is a function of engine speed only, and that function may be any desired relationship, for example, an ideal operating line for low fuel consumption, an ideal operating line for low emissions, or a compromise ideal operating line for low fuel consumption and low emissions. Torque, power or other desired performance parameters commanded by the accelerator pedal controls CVT ratio, and engine speed is determined by the load placed thereon, which is a function of road load and CVT ratio. Hence, throttle position is precisely adjusted in accordance with the ideal function for any load placed on the engine. With appropriately designed controls, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission. This control shceme is described below in greater detail.

It has been found that, due to inherent engine characteristics, the driveability and control of a vehicle governed by such a control scheme may be less than optimum. That is, the "feel" of the vehicle at certain engine speeds in response to accelerator pedal inputs may not approximate closely enough the feel of a vehicle with a conventional automatic transmission. Specifically, unless accelerator pedal movements are smoothly and meticulously controlled by the driver at lower engine speeds, the vehicle may tend to buck and lurch, and the engine may tend to speed up too quickly upon acceleration and run too fast. These undesirable characteristics apparently are due in part to the independent nature of the engine-CVT control scheme, whereby changes in engine torque resulting from changes in engine speed are amplified by sympathetic changes in throttle position dictated by the speed-dependent fuel function.

The problem tends to be more pronounced in the case of many normally aspirated spark-ignition internal combustion engines, which inherently have relatively steep torque-speed characteristics at low engine speeds. An example of this is illustrated by the ideal operating line $f(N_E)$ in the plot of FIG. 1. In the example shown, a significant proportion of engine operation occurs in the low power range, at speeds below about 1600 rpm, especially in the case of urban driving at low to moderate road speeds. In this "critical" engine speed or low power range, a slight deviation in engine speed results in a large change in engine torque, meaning that vehicle movement is very sensitive to small changes in load and accelerator pedal input. This sensitivity is heightened at higher transmission ratios—such as during start-up from rest—because engine torque is multiplied to a greater degree before reaching the driving wheels of the vehicle.

Another problem with this prior control scheme is that during startup, when the clutch is slipping, the throttle temporarily must be directly coupled to the accelerator pedal. This coupled control defeats the very object of the independent control scheme, resulting in engine operation off the ideal operating line and reduced efficiency. The optimum configuration is one in which the engine and CVT are independently controlled throughout the entire range of operation, including during startup when the clutch is slipping.

SUMMARY OF THE INVENTION

It is therefore an object of the present invention to overcome the above-noted problems of driveability and controllability of a CVT vehicle having an engine with a relatively steep torque-speed characteristic.

Another object of the invention is to provide a control scheme which makes vehicle movement less sensitive to accelerator pedal inputs and load changes when the engine is operating in the critical or low power speed range defined generally by the steep torque-speed characteristic.

Another object is to provide such a control scheme which still enables the vehicle power plant to deliver maximum power and torque when commanded by the accelerator pedal.

Another object of the invention is to provide such a control scheme which permits the engine to operate substantially along any desired optimum torque-speed curve.

Another object of the invention is to provide such a control scheme in which engine and CVT operation are always totally independent, even during transient periods such as startup when clutch slippage occurs.

Another object of the invention is to overcome the problems of controllability of any CVT-equipped power delivery system having a prime mover whose operation in the low power range is highly sensitive to load and commanded system performance.

These and other objects of the invention are accomplished by providing a method of controlling the low power operation of a prime mover-CVT power delivery system—the prime mover having fuel delivery means for delivering a variable quantity of fuel thereto—wherein a fuel function is predetermined which defines desired fuel requirements for the prime mover in relation to at least prime mover operating speed, the fuel function prescribing an increased fuel flow for a decrease in measured operating speed and a reduced fuel flow for an increase in measured operating speed. The fuel delivery means is controlled in accordance with the fuel function, whereby the speed of the prime mover is regulated in accordance with the load placed thereon. To command an increase in the power output of the system, the transmission ratio is reduced; to command a decrease in the power output of the system, the transmission ratio is increased. Under certain circumstances the fuel function can define desired fuel requirements in relation to measured fuel flow to the prime mover, in addition to prime mover operating speed.

The invention also encompasses a method of controlling the operation of a power delivery system operable over a power output spectrum consisting of a low power range and a high power range, the low power control being that which is described above; a complete power delivery system operable over the aforesaid power spectrum and including components for effecting the above-described low power control scheme; and a control system per se.

In practical terms, the above-described unorthodox inventive control scheme effectively regulates low power engine speed within a fairly narrow range (and in one specific embodiment maintains engine speed substantially constant at the no-load idle speed) while changing fuel flow to vary its output torque in accordance with load. The CVT effectively is coupled, therefore, to a relatively constant speed (and variable torque)

energy source—akin to a flywheel energy storage device—and energy transfer is dictated by CVT ratio changes which are the inverse of those involved in any prior control scheme and, indeed, in any other known system wherein an engine is directly coupled to a CVT. The engine is, therefore, inherently stable regardless of changing loads or power demands, resulting in greatly improved control. An appropriately designed transition scheme converts engine and transmission operation to the more familiar control in the high power range wherein increases in transmission ratio result in increased engine speed and fuel flow, and vice versa.

For convenience, the invention is described by way of example in the context of an internal combustion engine-CVT propulsion system for an automotive vehicle. It is to be understood, however, that the principles of the invention are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carburetted spark-ignition engine wherein fuel flow varies with throttle butterfly position, a fuel injected spark-ignition or diesel engine, a gas turbine, and so on.

BRIEF DESCRIPTION OF THE DRAWINGS

The novel features of the invention are set with particularity in the appended claims, but the invention will be understood more fully and clearly from the following detailed description of the invention as set forth in the accompanying drawings, in which:

FIG. 7 primarily relates to the engine control circuit;

FIG. 8 primarily relates to the starting clutch control circuit;

FIG. 9 primarily relates to the pressure generator for the driven sheave;

FIG. 10 illustrates a modification of the pressure generator for the driven sheave illustrated in FIG. 9.

DETAILED DESCRIPTION

Figure 2:
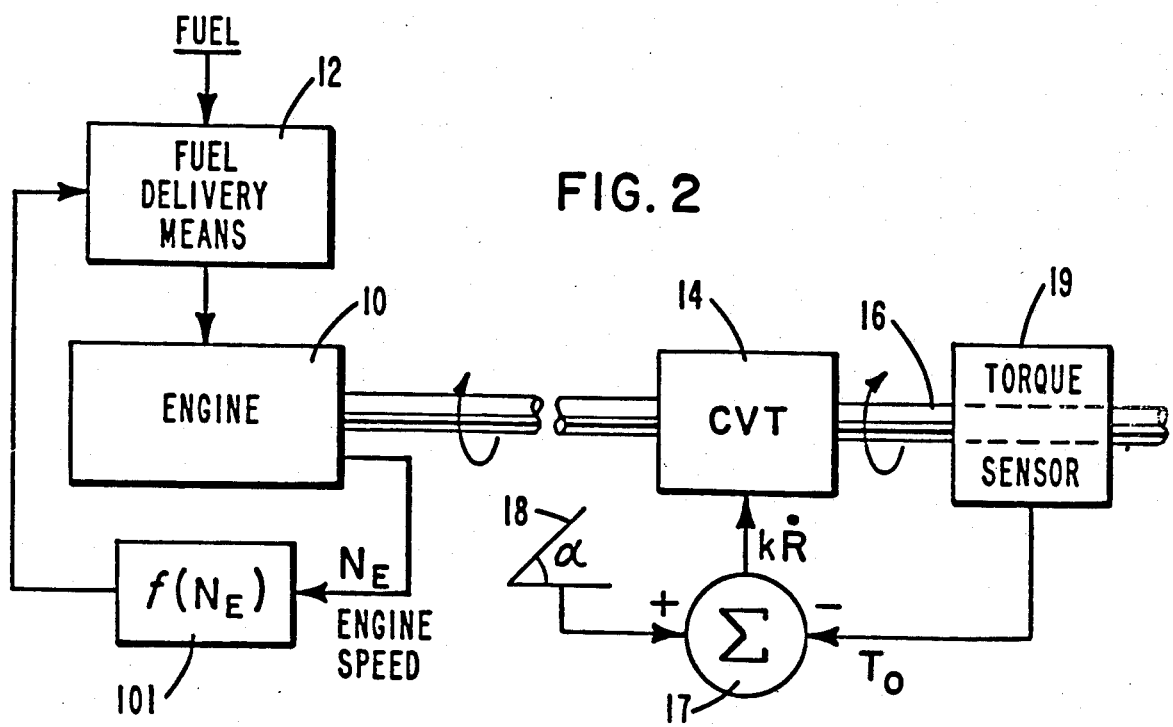
FIG. 2 is a schematic illustration showing the functional relationships of the components of an engine-CVT control scheme according to my prior U.S. Pat. No. 4,459,878.

FIG. 2 illustrates the functional relationships of the components of an engine-CVT control scheme according to my prior U.S. Pat. No. 4,459,878. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 may be one of the many types of known continuously variable ratio transmissions having finite or infinite ratio ranges. Output shaft 16 delivers power and torque from the engine and CVT. The ratio of the CVT is set by a CVT ratio controller 17, which generates a rate of change of ratio signal $k\dot{R}$ as a function of output torque $T_0$ measured by torque sensor 19 and commanded power or torque $\alpha$ commanded by accelerator pedal 18. Other parameters indicative of engine-CVT system performance may be used by ratio controller 17 to effect a chage of CVT ratio in a similar manner. For example, rather than using desired output power or torque and measured actual output torque, commanded and measured vehicle acceleration, output shaft acceleration, or other parameters could be used. In this embodiment, however, CVT ratio is strictly a function of commanded power or torque and measured output torque, and is completely independent of engine operation. Engine control, on the other hand, is provided by an engine controller 101 which adjusts fuel delivery means 12 in accordance with measured engine speed $N_E$. This relationship may desirably be an ideal engine operating line for low fuel consumption, an ideal operating line for low emissions, a compromise of the two, or any other desired engine operating characteristic.

Figure 3:
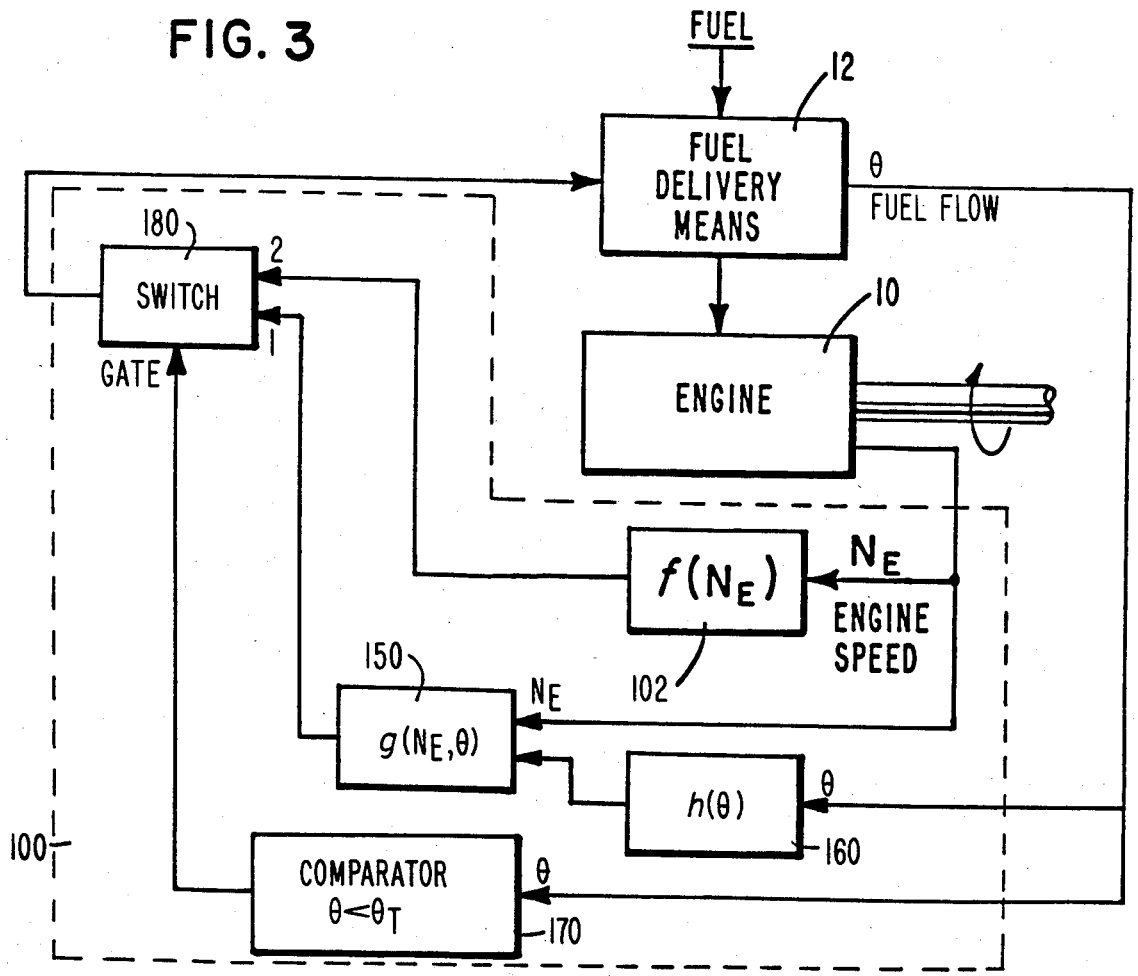
FIG. 3 is a schematic illustration, similar to FIG. 2, showing the functional relationship of the components of an engine-CVT control scheme according to the invention.

FIG. 3 illustrates the functional relationship of the components of an engine-CVT control scheme according to the invention. For the sake of simplicity the CVT and associated ratio controls—which are identical to those shown in FIG. 2—have been omitted from FIG. 3.

Engine control is maintained by an engine controller 100. A function generator $f(N_E)$ still is used, but only for controlling engine operation in the high power range. This function generator is designated by reference numeral 102. During the critical low power range of operation, fuel delivery means 12 is controlled by function generator 150, which generates a function g of engine speed $N_E$ and fuel flow (for example, throttle position). Engine speed $N_E$ is fed directly to function generator 150, while a separate throttle function $h(\theta)$ generated by function generator 160 is applied to function generator 150. Functions g and h are selected such that fuel flow through fuel delivery means 12 is increased for a measured decrease in engine operating speed and is reduced for a measured increase in engine operating speed. The transition between the low and high power ranges of operation is effected by comparator 170 which biases bistable switch 180 to position 1 whenever throttle position $\theta$ is less than the transition throttle position $\theta_T$ (illustrated as point T in FIG. 1) to feed the low power signal from function generator 150 to fuel delivery means 12. When throttle position $\theta$ is equal to or greater than the transition throttle position $\theta_T$, switch 180 moves to position 2, thereby leaving fuel delivery means 12 under the control of high power engine controller 102. By way of example, the transition throttle position $\theta_T$ might be 40% of full throttle opening.

Referring again to FIG. 1, a typical preferred operating line for the low power range is depicted by the bold dashed line labeled $g(N_E, \theta)$. This line is more normal to the BSFC contours than the adjacent solid inclined operating line along which the prior control system maintained engine operation. Hence, the bold dashed line represents a more economical configuration than the solid line, but would have been much more difficult to control by use of the simple fuel function $f(N_E)$ because it is even steeper than the solid line. Under the low power control scheme of this invention, however, the illustrated dashed line or, for that matter, any contour—be it positively inclined, negatively inclined or perfectly vertical—can be followed with a high degree of accuracy while maintaining stable engine and overall system control.

Figure 1:
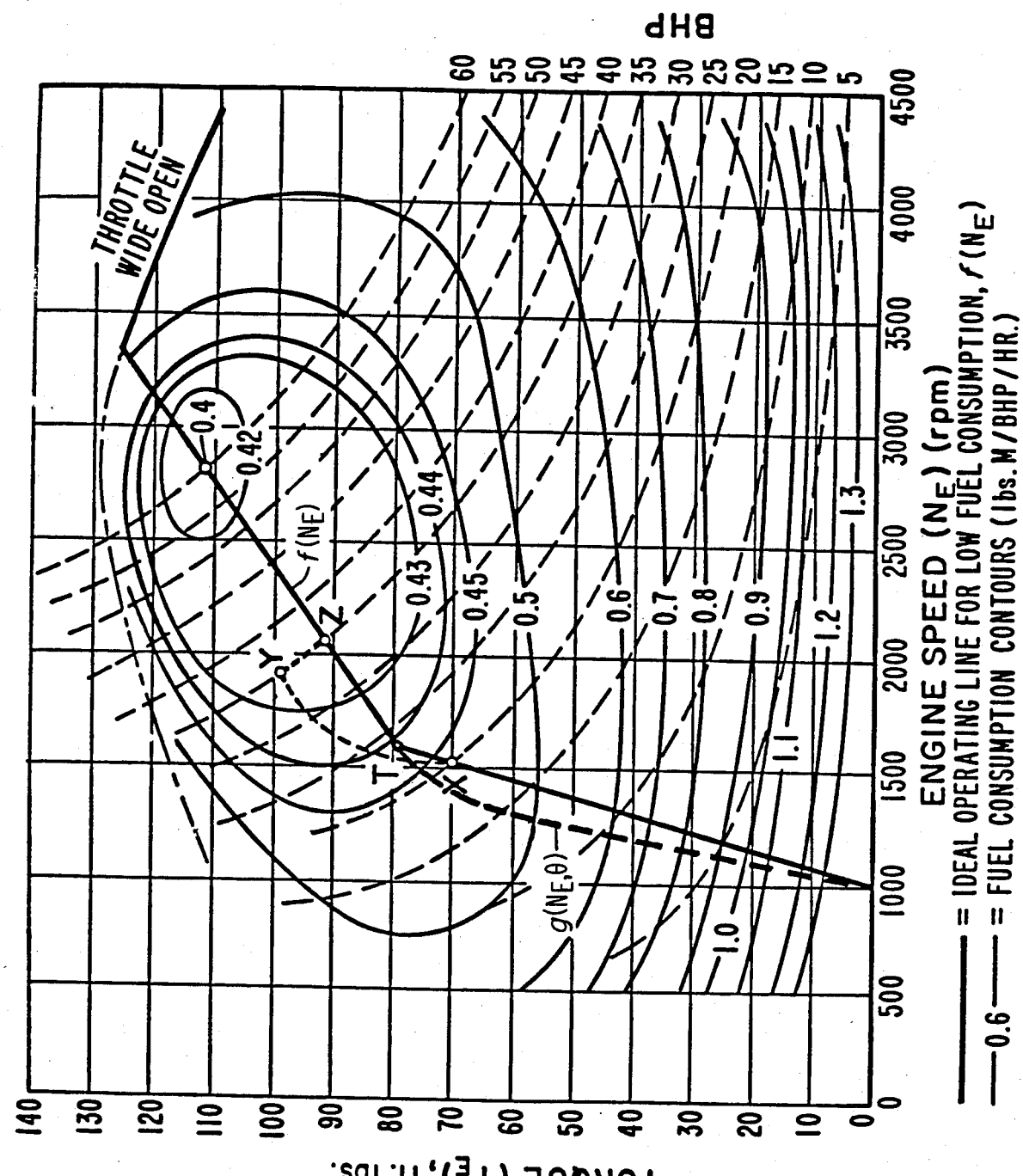
FIG. 1 is the performance map of a typical four cylinder passenger car engine having a displacement of approximately 2.5 liters.

The throttle control function represented by the bold dashed line $g(N_E, \theta)$ illustrated in FIG. 1 may be defined, for example, as follows:

$$g(N_E, \theta) = -K(N_E - h(\theta))$$

where
K = a constant, and
$h(\theta)$ is a selected function of throttle position $\theta$.

Figure 5:
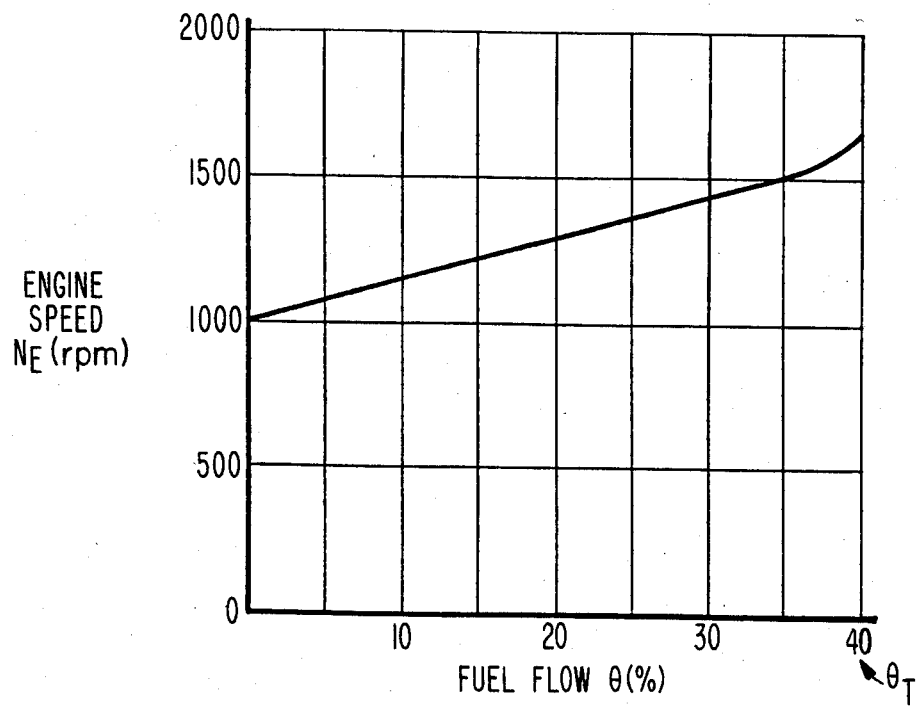
FIG. 5 is a plot of the function of fuel flow, $h(\theta)$, used to control engine operation in accordance with the invention.

An exemplary throttle function $h(\theta)$ is graphically illustrated in FIG. 5. The function is essentially a straight line function up to about 35% throttle opening, which corresponds to the generally straight line portion of the bold dashed line in FIG. 1. The last 5% of throttle opening, up to the transition throttle opening $\theta_T = 40\%$, is curved, which corresponds to the arcuate upper portion of the bold dashed line in FIG. 1. Depending on the contour of throttle function $h(\theta)$, virtually any positively sloped operating line can be selected.

In some circumstances it may be desirable to effect low power engine operation along a line having a negative slope (not illustrated). This will result in a progressive drop in engine speed as the vehicle accelerates. This control scheme works quite well despite this seemingly anomalous behavior, as long as the mininmum engine speed—which occurs at the transition point between the low and high power ranges—is above the stalling speed of the engine. A suitable function governing such operation can be arrived at by substituting $N_{IDLE}$ for $h(\theta)$ in the above equation, as follows:

$$\theta = -K(N_E - N_{IDLE})$$

where $N_{IDLE}$ = the no load idle speed of the engine.

For virtually constant engine speed operation at idle (i.e., along a vertical line), the following relationship is suitable:

$$\dot{\theta} = -K(N_E - N_{IDLE}).$$

In this situation, any variation of engine speed $N_E$ away from idle speed will effect a net rate of change of throttle position which will nullify the speed differential. This function is, in effect, an engine speed governor.

The instant invention involves, in part, the recognition that low power control of the ratio rate $\dot{R}$ of the CVT, rather than merely the CVT ratio, yields improved CVT control. This improved control can be explained by reference to the following derived vehicle performance equation:

$$\dot{N}_{DS} = \frac{-\dot{R}I_E N_E}{I_{EQ}} + \frac{T_E - T_{RL} - T_{loss}}{I_{EQ}}$$

where $$I_{EQ} = I_{CDS} + R^2 I_E,$$

$\dot{R}$ is the ratio rate of the transmission,
R is the ratio of the transmission,
$I_E$ is engine inertia,
$N_E$ is engine speed,
$T_E$ is engine torque,
$T_{RL}$ is road torque reflected to the drive shaft and includes tires, final drive and axle losses,
$T_{loss}$ is transmission loss,
$I_{CDS}$ is car inertia reflected to the drive shaft, and
$\dot{N}_{DS}$ is vehicle acceleration measured at the drive shaft.

It is clear that the acceleration of the vehicle $\dot{N}_{DS}$ is dependent primarily on control of any one or more of these variables such as, for example, $T_E$, R or $\dot{R}$. Generally, conventional vehicle systems vary the transmission ratio R and engine output torque $T_E$ to provide the required transmission and vehicle control. By controlling R, however, it is difficult to constantly maintain engine torque and speed along an ideal operating line. This is due to the fact that each time R is varied, the load on the engine is changed which, in turn, affects the engine's output torque and vehicle acceleration.

Prior art attempts to simultaneously change the engine torque and speed to force engine operation back on the ideal line have necessitated very complex control systems, since control is dependent on several variables of the above performance equation. For example, these prior art systems must necessarily perform the complicated task of calculating the necessary target throttle position and CVT ratio R to force engine operation back on the ideal line. These systems also require the calculation of ratio rate $\dot{R}$ so that the rate in changing the ratio to the target value does not result in undesirable vehicle dynamics. For example, if $\dot{R}$—which is positive for acceleration in prior art systems, and in my earlier control scheme—is selected to be excessive, then an undesirable deceleration of the vehicle will occur before the vehicle can accelerate. This phenomenon results from the negative sign of the $\dot{R}$ term in the above performance equation, and because that first term tends to dominate at low power operation.

With the low power control scheme of the invention, however, strictly regulated engine speed $N_E$ (which varies only within a relatively narrow range) dictates that acceleration be effected by a decrease in transmission ratio (i.e., $\dot{R}$ is negative). Thus, the net value of the first term of the above equation is postive and is added to the value of the positive second term, ruling out any anomalous behavior. On deceleration with the inventive control scheme (i.e., $\dot{R}$ is positive), the first term dominates, insuring that the vehicle will not accelerate before decelerating.

Figure 4:
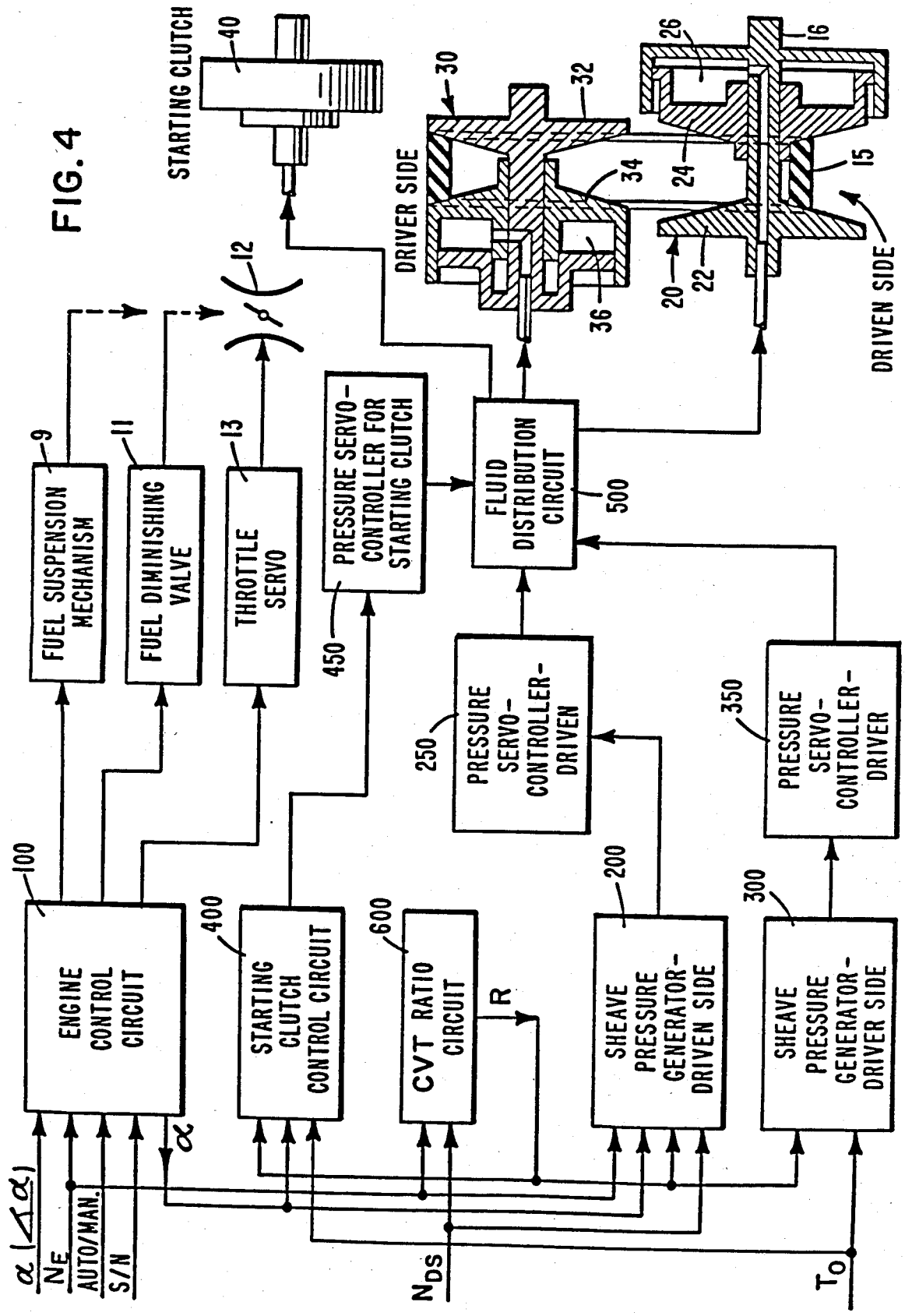
FIG. 4 is a schematic illustration showing the entire control system of the invention and its relationship to the CVT sheave and belt drive, and the vehicle starting clutch.

FIG. 4 schematically illustrates the entire control system in greater detail. The particular type of CVT illustrated in FIG. 4 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters and, hence, the transmission ratio R. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Proper pressures in chambers 26 and 36 to keep belt 15 under proper tension are maintained by the control system, as described below.

Fluid pressure for activating the driven sheave is provided by a sheave pressure generator 200 which acts through a pressure servo controller 250 and a fluid distribution circuit 500. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position $\alpha$, drive shaft speed $N_{DS}$ measured by a sensor associated with drive shaft 16, and CVT ratio signal R. Ratio signal R is generated by CVT ratio circuit 600 and is the quotient of engine speed $N_E$ divided by drive shaft speed $N_{DS}$.

Figure 6:
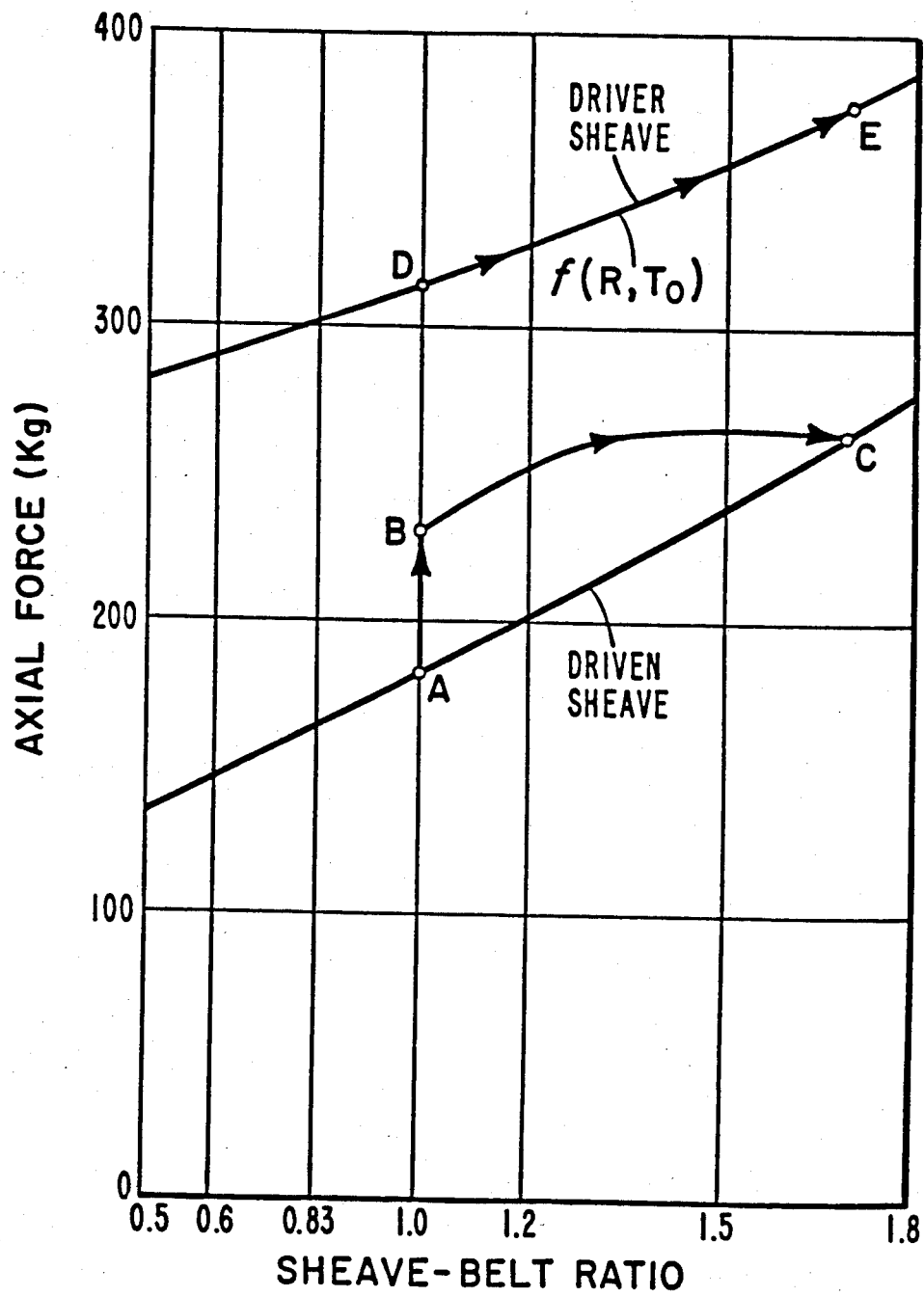
FIG. 6 is a graph which shows the forces applied to the driver and driven sheaves of the CVT as a function of transmission ratio.

Referring to FIG. 6, the mechanics of a change in CVT ratio now will be described with reference to the axial forces produced by the pressurized fluid in chambers 26 and 36. The lower curve in FIG. 6 is a plot of steady state axial force on movable portion 24 of driven sheave 20 as a function of CVT ratio. Similarly, the upper curve is a plot of steady state axial force tending to resist inward movement of movable portion 34 as a function of CVT ratio. As described below, when for example a signal is generated to increase the ratio of the CVT from 1.0 to approximately 1.7, the fluid pressure in chamber 26 is increased to raise the axial force from approximately 175 kg. to, ultimately, approximately 270 kg. Movable portion 24 does not move instantaneously, however, due to the inertia of the system. Accordingly, the curve which represents the transient change taking place in sheave 20 is defined by movement from point A to point B at a constant ratio of 1.0, and then to point C where equilibrium is reached. Correspondingly, an increase in pressure in chamber 36 of driver sheave 30 results in an increase in axial force on movable portion 34 of sheave 30 from approximately 315 kg. (point D) to approximately 380 kg. (equilibrium point E). Despite this increase in axial force, the increased tension on belt 15 occasioned by expansion of the diameter of sheave 20 forces the two portions 32, 34 of sheave 30 apart so that sheave 30 has a smaller driving diameter. Driver sheave 30, therefore, follows in a controlled manner any changes occurring to driven sheave 20.

Sheave pressure generator 300 generates a pressure appropriate for driver sheave 30 as a function of ratio R and measured output torque $T_O$. This function has been found to satisfactorily tension belt 15, without undue stress, and effect a smooth change of ratio. An example of a function suitable for this purpose is as follows:

$$P_{DR} = K_1 + \left(\frac{K_2}{R} + K_3\right) T_O$$

where $P_{DR}$ is the fluid pressure in chamber 36 of driver sheave 30, and $K_1$, $K_2$ and $K_3$ are appropriately selected constants.

The control of transmission ratio described above actually is a ratio rate control, $\dot{R}$. That is, the greater the magnitude of the increase (or decrease) in fluid pressure on driven sheave 20 commanded by accelerator pedal 18, the more rapid the change of sheave diameters will be. Thus, for example, a rapid depression of accelerator pedal 18 will result in a rapid change of CVT ratio and quick acceleration. This, of course, closely simulates the characteristics of a conventional vehicle.

Referring again to FIG. 4, the position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic or manual mode, and a start/neutral switch (S/N) which insures that the vehicle will remain stationary when the engine is started.

A starting clutch 40 is provided which couples engine 10 and CVT 14. Clutch 40 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, output torque To and the auto/manual switch, through servo controller 450 and fluid distribution circuit 500.

Figure 7:
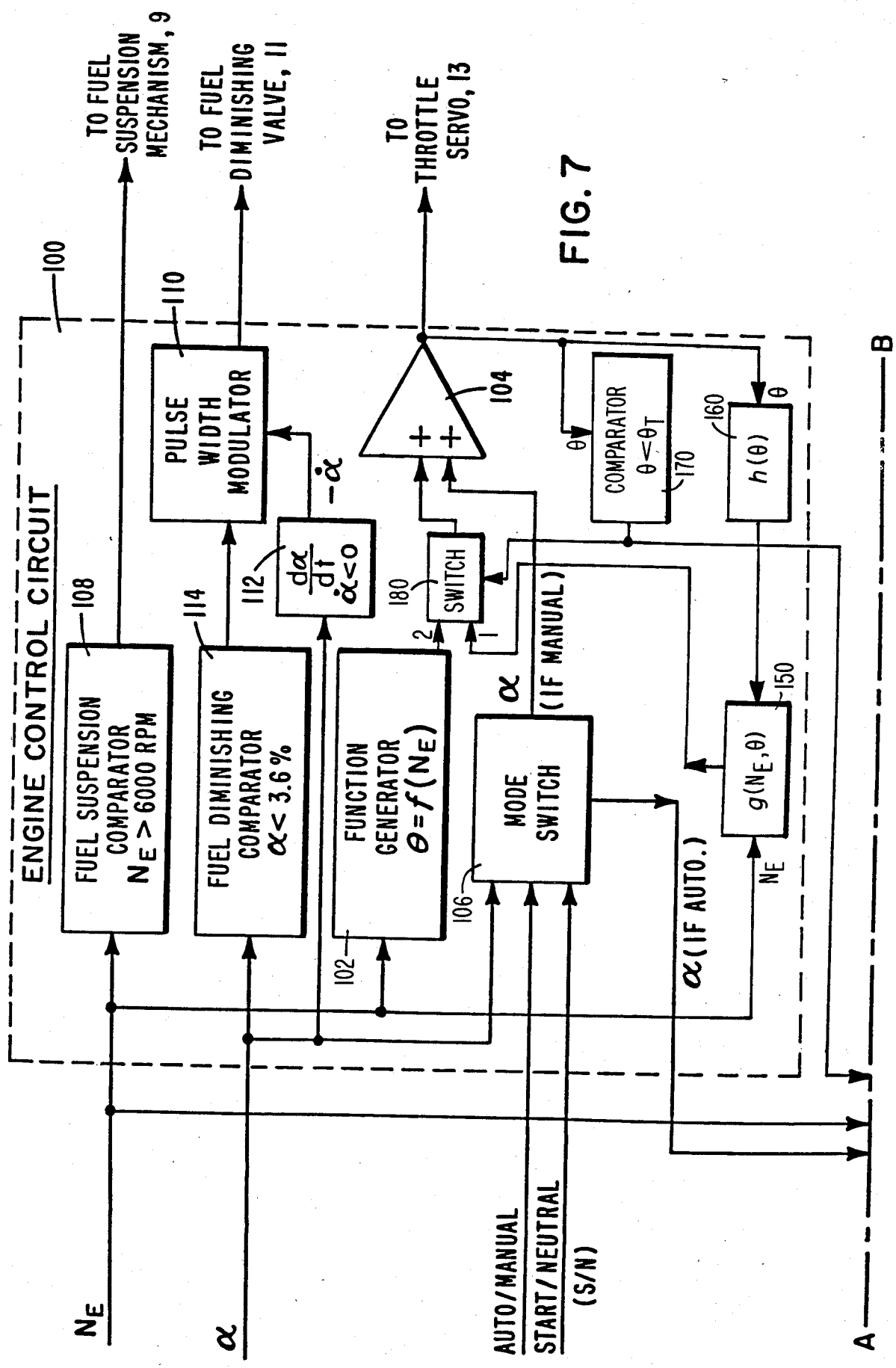
FIGS. 7 through 10 together schematically represent the entire engine-CVT control scheme according to the invention, the figures being interrelated as indicated therein by lines A-B, C-D and E-F.
Figure 8:
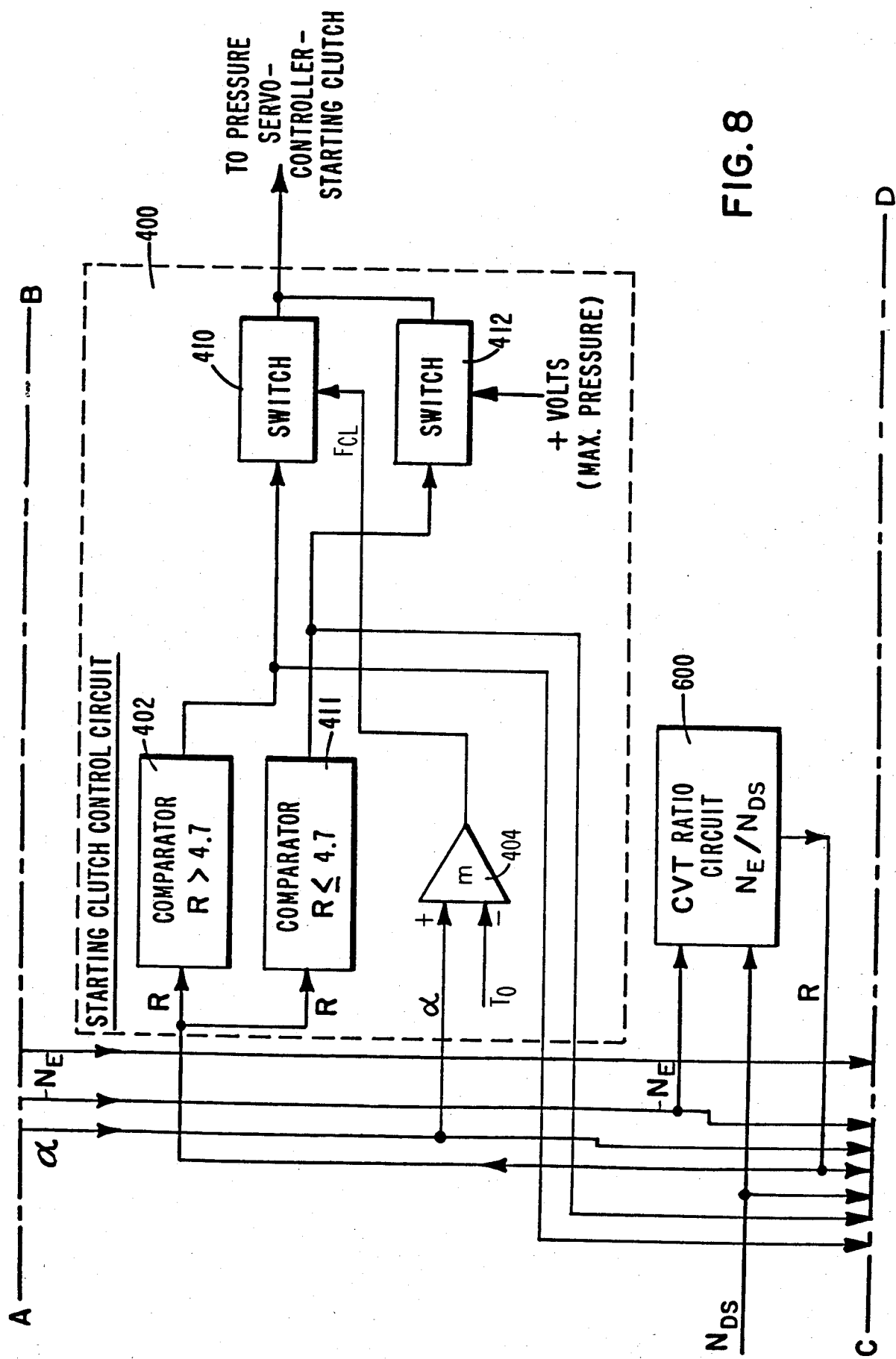
Figure 9:
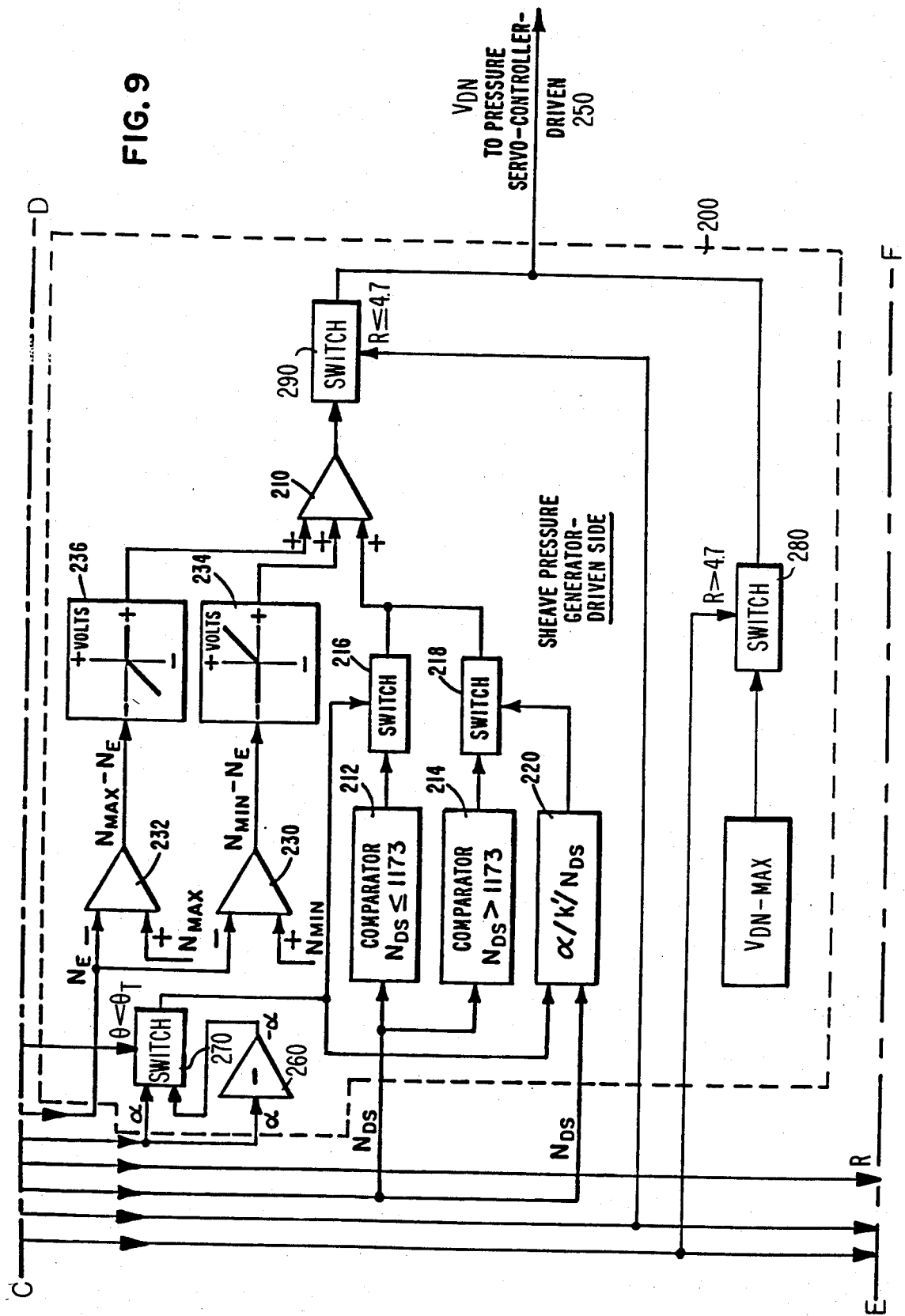

FIGS. 7, 8 and 9 schematically illustrate in greater detail the functional relationships of the components illustrated in FIG. 5. FIG. 7 is primarily directed to the engine control circuit 100. A key element of control circuit 100 is function generator 102, which may generate a function $\theta$ representative of any desired engine operating characteristic for high power operation. $\theta$ represents throttle angle, which is related to desired engine output torque. For this embodiment the function is chosen as the ideal engine operating line for low fuel consumption. FIG. 1 graphically illustrates this function as $f(N_E)$. The value of the function produced by generator 102 is fed to throttle servo 13 via switch 180 and amplifier 104. In the event the automatic control system is disabled, it is possible to switch to a manual mode through mode switch 106. In the manual mode, accelerator position $\alpha$ is directly communicated to throttle servo 13 via amplifier 104. The start/neutral switch S/N also operates through mode switch 106.

For low power operation, the value of the function $g(N_E, \theta)$ produced by function generator 150 is fed to throttle servo 13 via switch 180 and amplifier 104. Inputs to generator 150 are engine speed $N_E$ and a function of measured throttle position—$h(\theta)$—which is supplied by function generator 160. Switch 180 is controlled by comparator 170, which biases switch 180 to position 1 when throttle position $\theta$ is less than the transition throttle position $\theta_T$.

A fuel suspension comparator 108 provides for engine overspeed control, which may tend to occur upon vigorous acceleration in the high power range, or if there is a malfunction in the control system. Comparator 108 compares engine speed $N_E$ to the maximum permissible engine speed, for example, 6000 rpm. If $N_E$ is greater than 6000 rpm, fuel suspension mechanism 9 is activated to suspend delivery of fuel to engine 10. Fuel suspension mechanism 9 may be, for example, a solenoid cutoff valve.

Another engine speed control is provided to counteract the inherent tendency of the vehicle to speed up during high power operation (switch 180 in position 2) when the accelerator pedal is released. This phenomenon occurs upon deceleration because the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases $(-\dot{\alpha})$, and by reducing fuel flow even further when the accelerator pedal position $\alpha$ drops to below 3.6% of full excursion. To accomplish this control, a pulse width modulator 110 controls fuel diminishing valve 11, the duty cycle (i.e., the percentage of the pulse cycle during which fuel diminishing valve 11 is held open) of modulator 110 being inversely proportional to the rate at which pedal position $\alpha$ decreases $(-\dot{\alpha})$. $-\dot{\alpha}$ is derived from a differentiator 112 only if $\dot{\alpha}$ is less than zero. In addition, a fuel diminishing comparator 114 reduces the duty cycle of modulator 110 to or near zero when pedal position $\alpha$ drops to below 3.6%.

FIG. 8 relates primarily to the starting clutch control circuit 400. It will be appreciated that some type of coupling must be provided between the engine and the CVT (or between the CVT and the driving wheels of the vehicle) in order to permit the engine to idle while the vehicle is stationary. Any type of coupling will function in the system, although some are more compatible with the stated objects than others. For example, a fluid coupling could be used, but the mechanical losses inherent in such a device are antithetical to the desired objective of maximizing fuel economy. A torque converter with a lock-up clutch would be an improvement, but a mechanical clutch is preferred, and one which is hydraulically actuated would be well suited for this purpose. The object here, as in the conventional automobile, is to totally disengage the clutch when the vehicle is stationary, and to gradually engage it to begin vehicle movement and progressively engage the clutch further as the vehicle speed increases. To this end the measured transmission ratio R (which is computed as the quotient of engine speed $N_E$ and drive shaft speed $N_{DS}$ by ratio circuit 600) is fed to a comparator 402. Comparator 402 closes switch 410 when ratio signal R exceeds 4.7 to transmit a variable clutch engagement signal from summing amplifier 404 to the clutch pressure servo controller 450. At the same time, the CVT is physically constrained to maintain its maximum reduction ratio (see the discussion below in connection with FIGS. 9–10). Throughout the clutch slipping phase, however, independent regulated engine and CVT control is maintained, thereby optimizing system operation.

When ratio signal R equals or drops below 4.7, switch 410 opens and comparator 411 closes switch 412 to deliver maximum pressure to the clutch servo controller 450. Maximum pressure causes full engagement of the clutch. Beyond this point, vehicle acceleration in the low power range is effected by reducing the transmission ratio. In the high power range, vehicle acceleration is commanded by increasing the transmission ratio, but the ratio signal R will not exceed 4.7 due to the physical limitations of the CVT (see FIG. 11 and the related discussion below), so that the clutch will not slip at higher vehicle speeds.

As illustrated in FIG. 8, the variable clutch engagement signal is given by the following clutch engagement function $F_{CL}$:

$$F_{CL} = m(\alpha - T_o)$$

where
  m = a constant
  $\alpha$ = accelerator pedal position
  $T_o$ = output torque.

Although the clutch engagement function could strictly be a function of pedal position $\alpha$, or of pedal position and some other variable, a feedback of output torque $T_o$ as above is preferred because it will compensate for any slippage at the driving wheels, thereby effecting smoother clutch operation and vehicle acceleration.

It can be seen that if no start/neutral S/N switch were provided, any depression of accelerator pedal 18 upon startup would cause engagement of clutch 40 and a forward lurch of the vehicle. The S/N switch therefore effectively disables the effect of $\alpha$ on clutch 40 to permit safe startup.

FIG. 9 relates primarily to the sheave pressure generator 200 for the driven sheave 20. Bistable switch 270, under the influence of comparator 170, delivers the accelerator position signal ($\alpha$ for high power operation; $-\alpha$ for low power operation via amplifier 260) as a variable voltage $V_{DN}$ to the pressure servo controller 250 for the driven sheave through switch 216 and amplifier 210. Pressure generator 200 includes circuitry which changes the transmission ratio to increase the load on the engine if the engine tends to exceed the maximum operating speed of 5500 rpm ($N_{MAX}$). Also provided is circuitry for changing the transmission ratio to decrease the load on the engine should the engine speed tend to decrease below the idle speed of 1000 rpm ($N_{MIN}$, or $N_{IDLE}$ in this embodiment), for example, in case of a malfunction of the low power control system. This is accomplished by means of summing amplifiers 230, 232 and clipping circuits 234, 236. Summing amplifier 232 and clipping circuit 236 act to reduce pressure on the driven sheave 20 to increase the load on the engine. Amplifier 232 receives $N_E$, applied to its negative input terminal, and $N_{MAX}$, applied to its positive input terminal, and produces a summed output signal $N_{MAX}$-$N_E$. This summed output is applied to clipping circuit 236 which is a non-linear device having the characteristic shown in FIG. 9. This device can be, for example, a reverse biased diode which produces a negative substantially linear output for negative excursions of its input signal and a zero output for positive excursions.

Consequently, if $N_E$ exceeds $N_{MAX}$, the input signal applied to circuit 236 will be negative, thereby resulting in a negative output signal. This negative output signal is then applied to summing amplifier 210 to reduce the value of its summed output signal in proportion to the amount $N_E$ exceeds $N_{MAX}$. As a result, the pressure on driven sheave 20 will be proportionally decreased. On the other hand, if $N_E$ is less than $N_{MAX}$, the input signal applied to clipping circuit 236 will be positive, resulting in a zero output signal applied to amplifier 210. Such an output signal has no effect on the summed output signal of amplifier 210; thus, no change in the signal supplied to the driven servo-controller 250 is produced.

Summing amplifier 230 and clipping circuit 234 act to increase pressure on the driven sheave 20 to decrease the load on the engine. Amplifier 230 receives $N_E$, applied to its negative input terminal, and $N_{MIN}$, applied to its positive input terminal, and produces a summed output signal $N_{MIN}$-$N_E$. This summed output is applied to a clipping circuit 234 similar to circuit 236. Circuit 234, however, has a non-linear transfer characteristic which produces a positive substantially linear output for positive excursions of its input signal and a zero output for negative excursions. Circuit 234 can be, for example, a forward biased diode. If $N_E$ falls below $N_{MIN}$, the input signal applied to clipping circuit 234 will be positive, thereby resulting in a positive output signal. This positive output signal is then applied to summing amplifier 210 to increase the value of its summed output signal in proportion to the amount $N_E$ is less than $N_{MIN}$. As a result, the pressure on driven sheave 20 will be proportionally increased. On the other hand, if $N_E$ is greater than $N_{MIN}$, then zero output signal will be produced by circuit 234 which has no affect on the summed signal applied to servo-controller 250.

Pressure generator 200 also includes circuitry for adjusting the sensitivity of accelerator pedal 18, depending on vehicle speed, to more closely simulate the "feel" of a conventional vehicle. This is required because of the inherent operating characteristics of the engine and CVT. That is, at higher vehicle speeds, the torque produced by the engine remains fairly high and constant (see FIG. 1). In the conventional vehicle the remaining small percentage of torque which can be extracted from the engine is delivered to the rear wheels through a transmission in high gear with a fixed, very low reduction ratio. Vehicle acceleration is therefore fairly insensitive to accelerator pedal movement at high speeds. In a CVT equipped vehicle, however, depression of the accelerator pedal at high vehicle speed results in an increased reduction ratio and an associated multiplication of torque in excess of that provided in the conventional vehicle. Thus, if only direct accelerator pedal position $\alpha$ were used to control CVT ratio at higher vehicle speeds, vehicle response would be extremely sensitive to accelerator pedal movement. The sensitivity of the accelerator pedal 18 must therefore be dulled at higher vehicle speeds and under high power operation.

Pedal sensitivity is controlled by two comparators 212, 214. As long as vehicle speed is below a threshold equivalent of drive shaft speed $N_{DS}$ equal to or less than 1173 rpm (equivalent to maximum vehicle speed at maximum CVT ratio), switch 216 remains closed to deliver the $\alpha$ signal directly to amplifier 210. This effectively is torque control. When drive shaft speed $N_{DS}$ exceeds 1173 rpm, switch 216 opens and switch 218 is closed so that a pedal position signal equivalent to $\alpha$ divided by $N_{DS}$ (provided by divider 220) is delivered to amplifier 210. This effectively is power control. In this way, the effect of any movement of accelerator pedal 18 in the higher speed ranges is diminished so as to more closely simulate the pedal response of a conventional automobile.

Pressure generator 200 also includes circuitry for maintaining the reduction ratio of the CVT at a maximum during the clutch slipping phase. This is accomplished by applying a maximum voltage $V_{DN-MAX}$ to servo-collector 250 through switch 280 when ratio signal R exceeds 4.7. In conjunction with the pressure generator 300 for the driver sheave (described below and illustrated in FIG. 9A), this control scheme will keep the fixed and movable portions of driven sheave 20 fully compressed (see FIG. 4) for a maximum driven sheave diameter, and will keep the fixed and movable portions of driver sheave 30 fully separated for a minimum driver diameter and, hence, a maximum reduction ratio. When ratio signal R equals or falls below 4.7 (clutch fully engaged), switch 280 opens and switch 290 closes, applying the output of amplifier 210 to servo-controller 250. In this mode, the fluid pressure to driven sheave 20 can vary in accordance with changing power demands as described above.

Figure 9A:
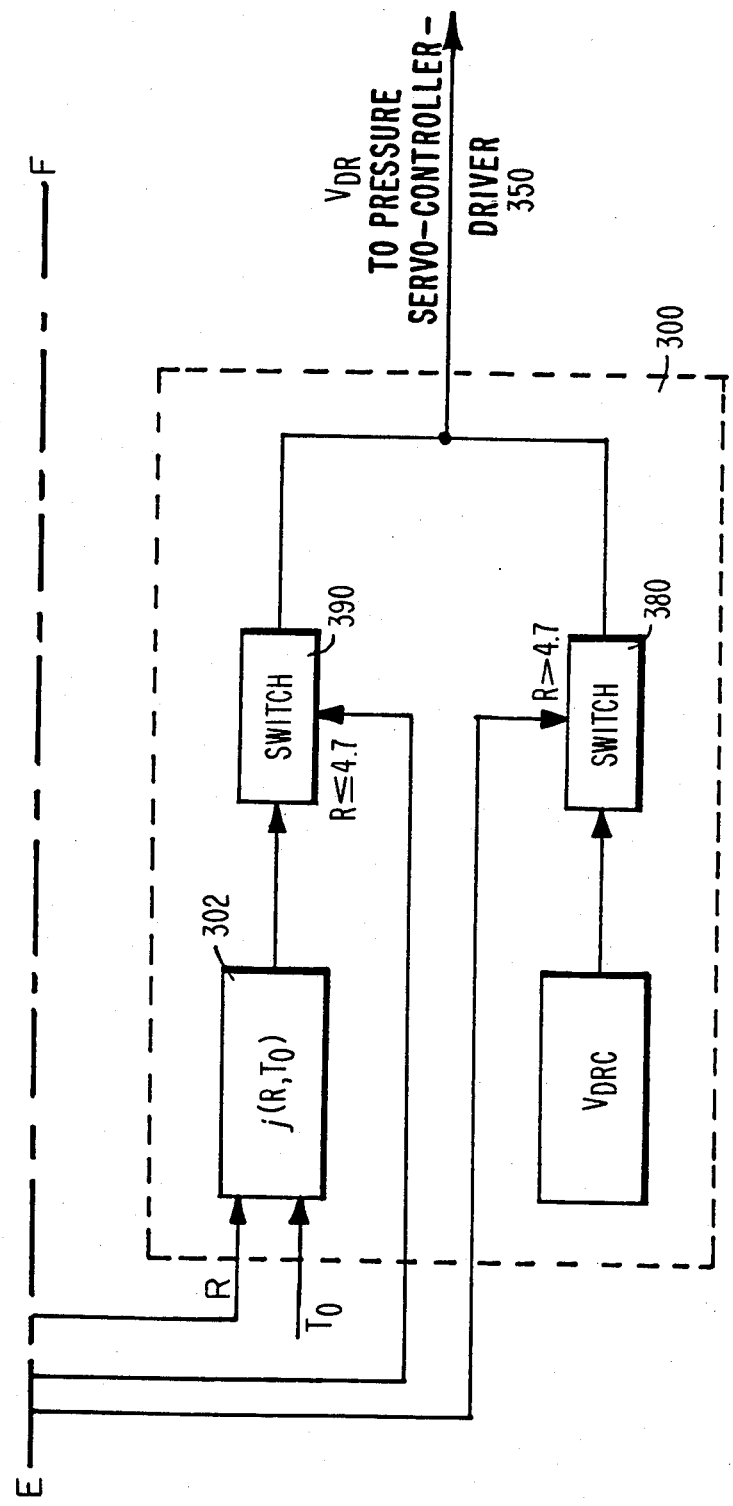
FIG. 9A primarily relates to the pressure generator for the driven sheave.

Referring to FIG. 9A, a voltage $V_{DR}$ is applied to the pressure servo-controller 350 for the driver sheave through either switch 380 or switch 390. Switch 380 closes when ratio signal R exceeds 4.7 (clutch slipping) to apply a constant predetermined voltage $V_{DRC}$ to servo-controller 350 and thereby maintain driver sheave 30 fully expanded for maximum CVT reduction ratio. When ratio signal R is equal to or less than 4.7, switch 380 opens and switch 390 closes to deliver a variable voltage to servo-controller 350 in accordance with function generator 302. The function $j(R, T_o)$ may be, for example, that disclosed above in connection with FIG. 6 and the mechanics of a CVT ratio change.

Figure 10:
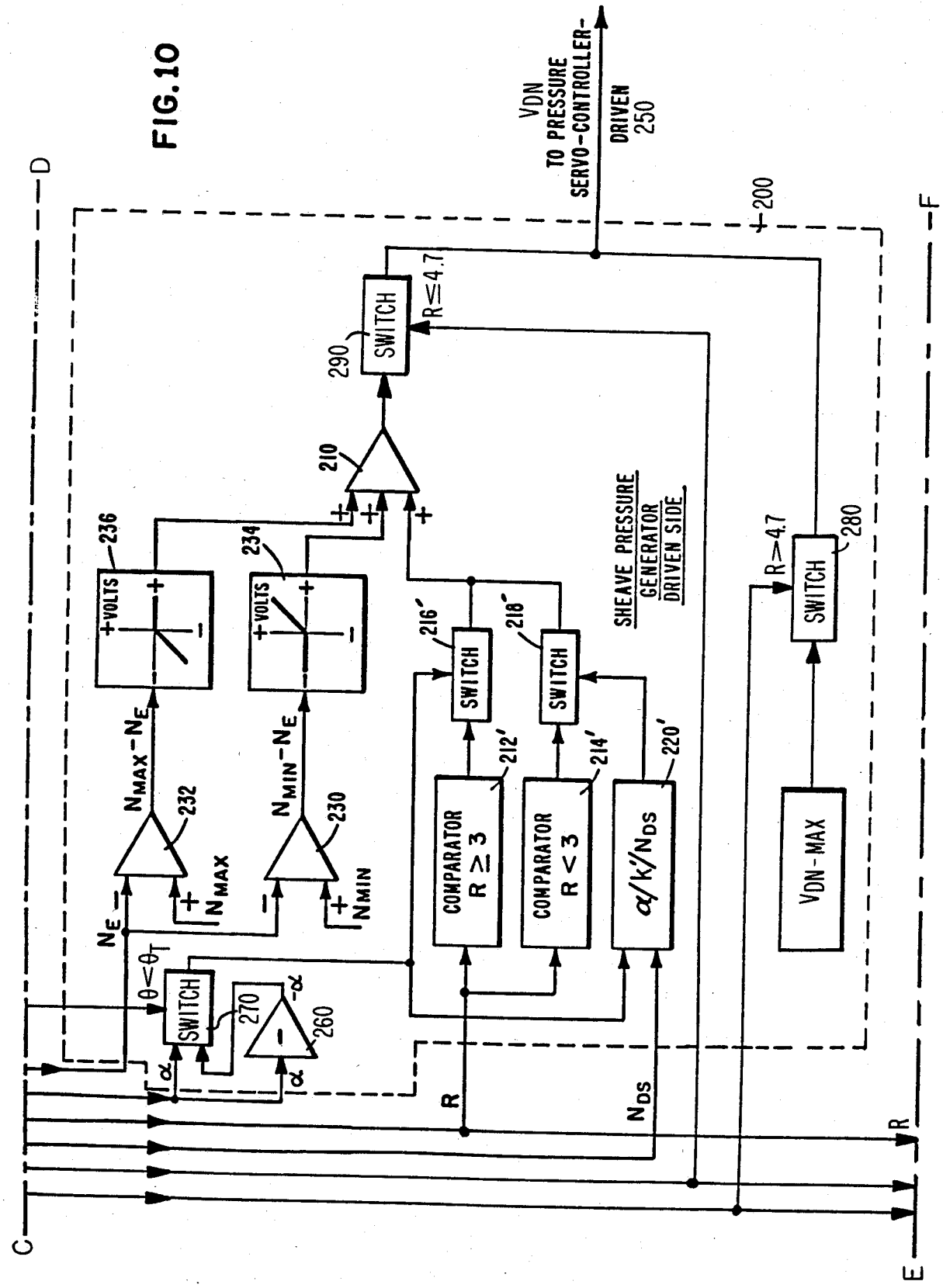

FIG. 10 shows a modification of the sheave pressure generator 200, wherein accelerator sensitivity is controlled as a function of ratio R. Comparator 212' closes switch 216' to connect the accelerator pedal position signal $\alpha$ directly to amplifier 210 when ratio R equals or exceeds 3. The comparator 214' closes switch 218' to feed a dulled signal to amplifier 210 from divider 220' when ratio R is below 3.

Figure 11:
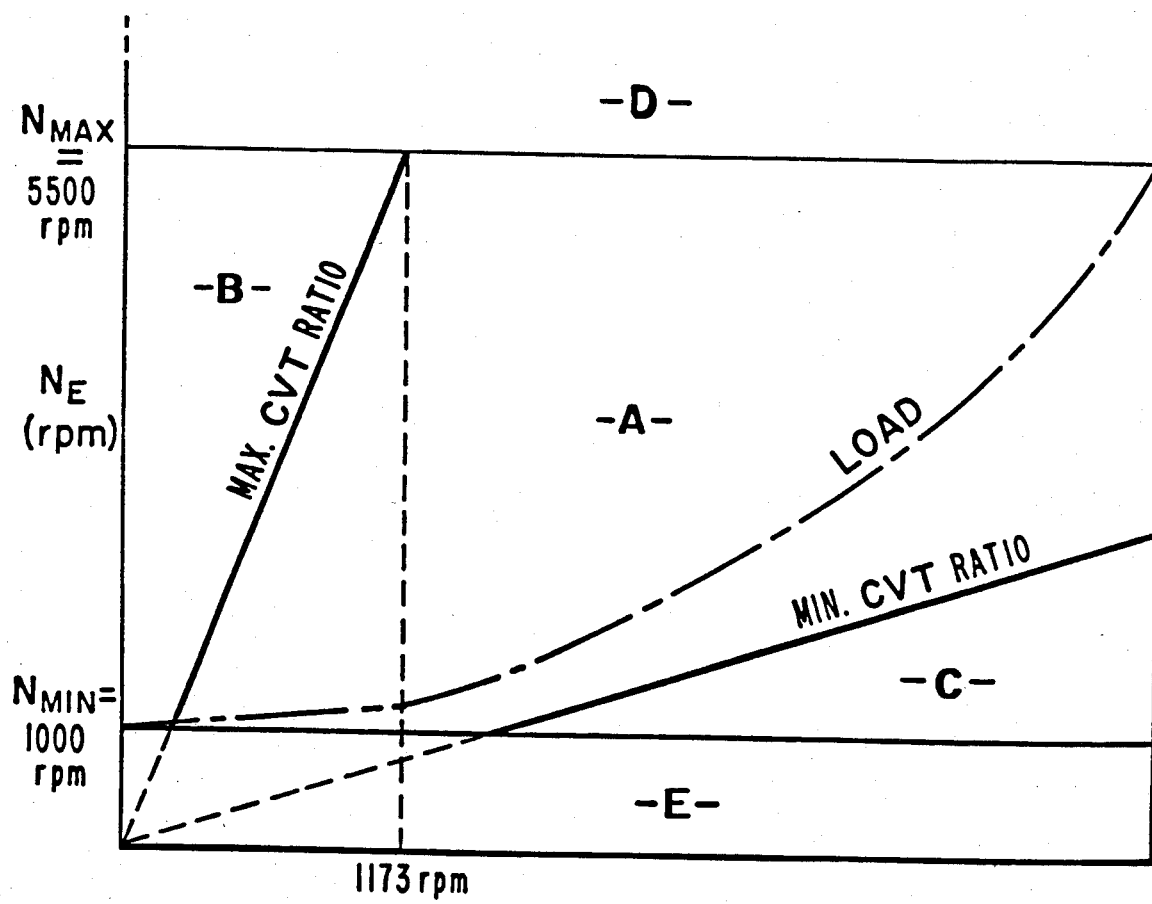
FIG. 11 is a graphical representation of the operation of an engine-CVT system in accordance with the control scheme of the invention.

The above described control scheme of the invention is graphically illustrated in FIG. 11. FIG. 11 is a plot of engine speed $N_E$ as a function of vehicle speed or drive shaft speed $N_{DS}$. The minimum and maximum CVT ratios are illustrated by the straight lines emanating from the origin of the graph. The idle speed ($N_{IDLE}=N_{MIN}=1000$ rpm) is indicated by a lower horizontal line, while the maximum permissible engine speed ($N_{MAX}=5500$ rpm) is indicated by an upper horizontal line. The maximum vehicle speed is defined by a vertical line at the right hand edge of the graph.

The graph of FIG. 11 is divided into a number of discrete operating regions. "A" designates the normal region of operation of the engine-CVT system. Region "A" is bounded by the line of maximum CVT ratio, the line of maximum engine speed, the line of maximum vehicle speed, the line of minimum CVT ratio and the idle speed line. During operation of the system in region "A", clutch 40 is fully engaged and throttle position is controlled in accordance with the prescribed fuel functions. Operation to the left of the dashed vertical line indicating a drive shaft speed of 1,173 rpm (equivalent to maximum vehicle speed at maximum CVT ratio) is under torque control, while operation to the right of this line is under power control (see the accelerator pedal sensitivity circuitry illustrated in FIGS. 9 and 10). Region "B" is the region of start-up control, that is, the operation of the engine-CVT system during slow vehicle operation when clutch 40 is only partially engaged. The control for this operation (400) is illustrated in FIG. 8.

Opertion of the engine-CVT system in the remaining three regions "C", "D" and "E" is effectively prevented by the above described control system. That is, operation in region "C" is prevented by the physical limitation of minimum CVT ratio, and by the fuel diminishing circuits comprising fuel diminishing valve 11, pulse width modulator 110, differentiator 112 and fuel diminishing comparator 114 of engine control circuit 100 (FIG. 7). Region "D" is the region of overspeed control, governed by the fuel suspension mechanism 9 and fuel suspension comparator 108 of engine control circuit 100 (FIG. 7), and by amplifier 232 and clipping circuit 236 of sheave pressure generator 200 (FIG. 9). Region E is the region of engine idle control which is governed by the low power control scheme $g(N_E, \theta)$ or, in some instances, by amplifier 230 and clipping circuit 234 of sheave pressure generator 200 (FIG. 9).

Also shown on the graph of FIG. 11 is a load line which indicates the engine speed required to maintain any constant vehicle speed along a level road. The term "load" includes road load, final drive losses and the like, and represents the actual load on the engine-CVT system. In order for the control scheme of the invention to function only in accordance with the prescribed fuel functions so as to maintain engine operation along the ideal operating line, it is desirable that the CVT ratio range include substantially all ratios required to maintain constant vehicle speed for any normally encountered load. That is, the minimum CVT ratio preferably is smaller than that required to maintain constant vehicle speed along a level road, and the maximum CVT ratio preferably is greater than that required to maintain constant vehicle speed up the steepest grade which one might expect to encounter. This relationship is graphically illustrated by the physical location of the load line in the graph of FIG. 11 above the line of minimum CVT ratio in region "A". All other load lines should lie below the line of maximum CVT ratio. A desirable CVT ratio range for accomplishing this is approximately 11:1 with, for example, a maximum CVT ratio of 22:1 (total vehicle ratio, including final drive ratio), and a minimum CVT ratio of 2:1. A transmission having such a wide ratio range is disclosed in commonly assigned application Ser. No. 290,293, filed Aug. 5, 1981. Of course, a CVT having a smaller ratio range would be operable, but would not have as much flexibility as one with a wider range. An infinite CVT ratio range would, of course, provide maximum flexibility.

The above-described control scheme quite simply and effectively accomplishes its primary objective of maintaining engine operation along any ideal operating line, for example, that of minimum fuel consumption, while maintaining stable operating characteristics, even during the transient startup phase when the clutch is slipping. Independent engine and CVT control always is maintained. The specific parameter values set forth in the preferred embodiment described above are in no way intended to limit the scope of the invention, it being apparent that these parameters will vary in accordance with engine, transmission and vehicle design, and desired behavior and performance. While an electronic control system has been schematically illustrated in the preferred embodiment, it is to be understood that any type of control system which functions in a similar manner may be used. It would appear that a control system incorporating many mechanical components would perhaps be the most reliable and least expensive alternative. For example, engine speed control throughout its entire operating spectrum could be achieved by use of a mechanical regulator having centrifugally actuated camming surfaces: one for low power operation defining the dashed steep portion of the operating line of FIG. 1, and another for high power operating defining the remainder of the operating line. Transition between the two power ranges could be effected in a simple mechanical manner by moving from one camming surface to another. Numerous other modifications of the invention will be apparent to those skilled in the art without departing from the essence and scope of the invention which is defined by the appended claims.

I claim:

1. A method of controlling the low power operation of a power delivery system including a prime mover and a continuously variable ratio transmission coupled to the prime mover for delivering power from the prime mover to an output shaft, the prime mover having fuel delivery means for delivering a variable quantity of fuel thereto, the method comprising the steps of:

measuring the speed of the prime mover;

predetermining a fuel function defining desired fuel requirements for the prime mover in relation to at least prime mover operating speed, said fuel function prescribing an increased fuel flow for a decrease in measured operating speed and a reduced fuel flow for an increase in measured operating speed;

controlling the fuel delivery means only in accordance with said fuel function, whereby the speed of the prime mover is regulated in accordance with the load placed thereon; and commanding desired performance of the power delivery system by reducing the transmission ratio to command an increase in power output and increasing the transmission ratio to command a reduction in power output.

2. A method according to claim 1 wherein said fuel function is the ideal operating line for minimum fuel consumption.

3. A method according to claim 1 wherein the prime mover is the engine of an engine-driven vehicle.

4. A method according to claim 3 wherein the engine is an internal combustion engine.

5. A method according to claim 4 wherein said fuel function is the ideal operating line for minimum fuel consumption.

6. A method according to claim 1 or 4 wherein said fuel function defines desired fuel requirements as a function of prime mover operating speed and measured fuel flow.

7. A method according to claim 6 wherein said fuel function is given by $$-K(N_E - h(\theta))$$

where

K = a constant, $N_E$ = prime mover operating speed, $\theta$ = measured fuel flow, and
h($\theta$) = a function of measured fuel flow.

8. A method according to claim 1 or 4 wherein said fuel function prescribes that the prime mover operate substantially at constant speed.

9. A method according to claim 8 where said fuel function prescribes that the prime mover operate substantially at the no-load idle speed thereof.

10. A method according to claim 9 wherein said fuel function defines a rate of change of fuel flow and is given by $$-K(N_E - NIDLE)$$

where
K = a constant,
$N_E$ = prime mover operating speed, and
NIDLE = prime mover no-load idle speed.

11. A method according to claim 1 or 4 wherein said fuel function prescribes that the prime mover operate at or below the no-load idle speed thereof.

12. A method according to claim 11 wherein said fuel function is given by $$-K(N_E - NIDLE)$$

where
K = a constant,
$N_E$ = prime mover operating speed, and
NIDLE = prime mover no-load idle speed.

13. A system for controlling the low power operation of a power delivery system including a prime mover and a continuously variable ratio transmission coupled to the prime mover for delivering power from the prime mover to an output shaft, the prime mover having fuel delivery means for delivering a variable quantity of fuel thereto, the control system comprising:
    speed measuring means for measuring the speed of the prime mover;
    fuel function means defining desired fuel requirements for the prime mover in relation to at least prime mover operating speed, said fuel function prescribing an increased fuel flow for a decrease in measured operating speed and a reduced fuel flow for an increase in measured operating speed;
    fuel control means operatively coupled to the fuel delivery means and to said speed measuring means and said fuel function means for controlling the fuel delivery means only in accordance with said fuel function, whereby the speed of the prime mover is regulated in accordance with the load placed thereon; and
    command means operatively coupled to the transmission for commanding desired performance of the power delivery system by reducing the transmission ratio to increase power output and increasing the transmission ratio to reduce power output.

14. A system according to claim 13 wherein said fuel function is the ideal operating line for minimum fuel consumption.

15. A system according to claim 13 wherein the prime mover is the engine of an engine-driven vehicle.

16. A system according to claim 15 wherein the engine is an internal combustion engine.

17. A system according to claim 16 wherein said fuel function is the ideal operating line for minimum fuel consumption.

18. A system according to claim 13 or 16 wherein said fuel function defines desired fuel requirements as a function of prime mover operating speed and measured fuel flow.

19. A system according to claim 18 wherein said fuel function is given by $$-K(N_E - h(\theta))$$

where
K = a constant,
$N_E$ = prime mover operating speed,
$\theta$ = measured fuel flow, and
h($\theta$) = a function of measured fuel flow.

20. A system according to claim 13 or 16 wherein said fuel function prescribes that the prime mover operate substantially at constant speed.

21. A system according to claim 20 where said fuel function prescribes that the prime mover operate substantially at the no-load idle speed thereof.

22. A system according to claim 21 wherein said fuel function defines a rate of change of fuel flow and is given by $$-K(N_E - NIDLE)$$

where
K = a constant,
$N_E$ = prime mover operating speed, and
NIDLE = prime mover no-load idle speed.

23. A system according to claim 13 or 16 wherein said fuel function prescribes that the prime mover operate at or below the no-load idle speed thereof.

24. A system according to claim 23 wherein said fuel function is given by $$-K(N_E - NIDLE)$$

where
K = a constant,
$N_E$ = prime mover operating speed, and
NIDLE = prime mover no-load idle speed.

25. A method of controlling the operation of a power delivery system operable over a power output spectrum consisting of a low power range and a high power range, the system including a prime mover and a continuously variable ratio transmission coupled to the prime mover for delivering power from the prime mover to an output shaft, the prime mover having fuel delivery means for delivering a variable quantity of fuel thereto, the method comprising the steps of:
    during operation in the low power range, commanding desired performance of the power delivery system by reducing the transmission ratio to command an increase in power output and increasing the transmission ratio to command a reduction in power output;
    during operation in the high power range, commanding desired performance of the power delivery system by increasing the transmission ratio to command an increase in power output and reducing the transmission ratio to command a reduction in power output;
    measuring the speed of the prime mover;
    predetermining a fuel function defining desired fuel requirements for the prime mover in relation to at least prime mover operating speed, said fuel function prescribing in the low power range an increased fuel flow for a decrease in measured operating speed and a reduced fuel flow for an increase in measured operating speed, and prescribing in the high power range an increased fuel flow for an increase in operating speed and a reduced fuel flow for a decrease in operating speed; and controlling said fuel delivery means only in accordance with the fuel function, whereby the speed of the prime mover is regulated in the low power range in accordance with the load placed thereon, an varies directly in accordance with commanded system performance in the high power range.

26. A method according to claim 25 wherein said fuel function is the ideal operating line for minimum fuel consumption.

27. A method according to claim 25 wherein the prime mover is the engine of an engine-driven vehicle.

28. A method according to claim 27 wherein the engine is an internal combustion engine.

29. A method according to claim 28 wherein said fuel function is the ideal operating line for minimum fuel consumption.

30. A method according to claim 25 or 28 wherein said fuel function defines desired fuel requirements for the low power range as a function of prime mover operating speed and measured fuel flow.

31. A method according to claim 30 wherein said fuel function for the low power range is given by $$-K(N_E - h(\theta))$$

where
 K = a constant,
 $N_E$ = prime mover operating speed,
 $\theta$ = measured fuel flow, and
 $h(\theta)$ = a function of measured fuel flow.

32. A method according to claim 25 or 28 wherein said fuel function prescribes for the low power range that the prime mover operate substantially at constant speed.

33. A method according to claim 32 where said fuel function prescribes for the low power range that the prime mover operate substantially at the no-load idle speed thereof.

34. A method according to claim 33 wherein said fuel function defines for the low power range a rate of change of fuel flow and is given by $$-K(N_E - NIDLE)$$

where
 K = a constant,
 $N_E$ = prime mover operating speed, and
 NIDLE = prime mover no-load idle speed.

35. A method according to claim 25 or 28 wherein said fuel function prescribes for the low power range that the prime mover operate at or below the no-load idle speed thereof.

36. A method according to claim 35 wherein said fuel function for the low power range is given by $$-K(N_E - NIDLE)$$

where
 K = a constant,
 $N_E$ = prime mover operating speed, and
 NIDLE = prime mover no-load idle speed.

37. A power delivery system operable over a power output spectrum consisting of a low power range and a high power range, the system comprising:

a prime mover;

a continuously variable ratio transmission coupled to said prime mover;

an output shaft coupled to said transmission for receiving power from said prime mover through said transmission;

fuel delivery means for delivering a variable quantity of fuel to said prime mover;

command means operatively coupled to said transmission for commanding a desired power delivery system performance, said command means operative in the low power range to reduce the transmission ratio to increase power output and to increase the transmission ratio to reduce power output, and operative in the high power range to increase the transmission ratio to increase power output and to reduce the transmission ratio to reduce power output;

speed measuring means for measuring the speed of said prime mover;

fuel function means defining desired fuel requirements for said prime mover in relation to at least prime mover operating speed, said fuel function prescribing in the low power range an increased fuel flow for a decrease in measured operating speed and a reduced fuel flow for an increase in measured operating speed, and prescribing in the high power range an increased fuel flow for an increase in operating speed and a reduced fuel flow for a decrease in operating speed; and fuel control means operatively coupled to said fuel delivery means, said speed measuring means and said fuel function means for controlling said fuel delivery means in only accordance with said fuel function, whereby the speed of said prime mover is regulated in the low power range in accordance with the load placed thereon, and varies directly in the high power range in accordance with commanded system performance.

38. A system according to claim 37 wherein said fuel function is the ideal operating line for minimum fuel consumption.

39. A system according to claim 37 wherein said prime mover is the engine of an engine-driven vehicle.

40. A system according to claim 39 wherein said engine is an internal combustion engine.

41. A system according to claim 40 wherein said fuel function is the ideal operating line for minimum fuel consumption.

42. A system according to claim 37 or 40 wherein said fuel function defines desired fuel requirements for the low power range as a function of prime mover operating speed and measured fuel flow.

43. A system according to claim 42 wherein said fuel function for the low power range is given by $$-K(N_E - h(\theta))$$

where
 K = a constant,
 $N_E$ = prime mover operating speed,
 $\theta$ = measured fuel flow, and
 $h(\theta)$ = a function of measured fuel flow.

44. A system according to claim 37 or 40 wherein said fuel function prescribes for the low power range that the prime mover operate substantially at constant speed.

45. A system according to claim 44 where said fuel function prescribes for the low power range that the prime mover operate substantially at the no-load idle speed thereof.

46. A system according to claim 45 wherein said fuel function defines for the low power range a rate of change of fuel flow and is given by $$-K(N_E-NIDLE)$$

where
  $K$ = a constant,
  $N_E$ = prime mover operating speed, and
  NIDLE = prime mover no-load idle speed.

47. A system according to claim 37 or 40 wherein said fuel function prescribes for the low power range that the prime mover operate at or below the no-load idle speed thereof.

48. A system according to claim 47 wherein said fuel function for the low power range is given by $$-K(N_E-NIDLE)$$

where
  $K$ = a constant,
  $N_E$ = prime mover operating speed, and
  NIDLE = prime mover no-load idle speed.

49. A method of controlling the partial low power operation of a power delivery system including a prime mover having fuel delivery means for delivering a variable quantity of fuel thereto, a continuously variable ratio transmission, and variably engageable coupling means for variably coupling and delivering power from the power delivery system to an output shaft, the partial low power operation occurring when the coupling means is less than fully engaged, the method comprising the steps of:
  measuring the speed of the prime mover;
  predetermining a fuel function defining desired fuel requirements for the prime mover in relation to at least prime mover operating speed, said fuel function prescribing an increased fuel flow for a decrease in measured operating speed and a reduced fuel flow for an increase in measured operating speed;
  controlling the fuel delivery means only in accordance with said fuel function, whereby the speed of the prime mover is regulated in accordance with the load placed thereon; and
  commanding desired performance of the power delivery system by varying the degree of engagement of the coupling means.

50. A method according to claim 49 wherein the step of commanding desired performance includes maintaining the transmission at a substantially constant high reduction ratio.

51. A method according to claim 49 wherein said fuel function is the ideal operating line for minimum fuel consumption.

52. A method according to claim 49 wherein the prime mover is the engine of an engine-driven vehicle.

53. A method according to claim 52 wherein the engine is an internal combustion engine.

54. A method according to claim 53 wherein the step of commanding desired performance includes maintaining the transmission at a substantially constant high reduction ratio.

55. A method according to claim 53 wherein said fuel function is the ideal operating line for minimum fuel consumption.

56. A method according to claim 49 or 53 wherein said fuel function defines desired fuel requirements as a function of prime mover operating speed and measured fuel flow.

57. A method according to claim 56 wherein said fuel function is given by $$-K(N_E-h(\theta))$$

where
  $K$ = a constant,
  $N_E$ = prime mover operating speed,
  $\theta$ = measured fuel flow, and
  $h(\theta)$ = a function of measured fuel flow.

58. A method according to claim 49 or 53 wherein said fuel function prescribes that the prime mover operate substantially at constant speed.

59. A method according to claim 58 where said fuel function prescribes that the prime mover operate substantially at the no-load idle speed thereof.

60. A method according to claim 59 wherein said fuel function defines a rate of change of fuel flow and is given by $$-K(N_E-NIDLE)$$

where
  $K$ = a constant,
  $N_E$ = prime mover operating speed, and
  NIDLE = prime mover no-load idle speed.

61. A method according to claim 49 or 53 wherein said fuel function prescribes that the prime mover operate at or below the no-load idle speed thereof.

62. A method according to claim 61 wherein said fuel function is given by $$-K(N_E-NIDLE)$$

where
  $K$ = a constant,
  $N_E$ = prime mover operating speed, and
  NIDLE = prime mover no-load idle speed.

63. A method of controlling the low power operation of a power delivery system including a prime mover having fuel delivery means for delivering a variable quantity of fuel thereto, a continuously variable ratio transmission, and variably engageable coupling means for variably coupling and delivering power from the power delivery system to an output shaft, the low power operation consisting of a partial power phase during which the coupling means is less than fully engaged, and a full power phase during which the coupling means is fully engaged, the method comprising the steps of:
  measuring the speed of the prime mover;
  predetermining a fuel function defining desired fuel requirements for the prime mover in relation to at least prime mover operating speed, said fuel function prescribing an increased fuel flow for a decrease in measured operating speed and a reduced fuel flow for an increase in measured operating speed;
  controlling the fuel delivery means during both phases of low power operation only in accordance with said fuel function, whereby the speed of the prime mover is regulated in accordance with the load placed thereon;

commanding desired performance of the power delivery system during the partial power phase by varying the degree of engagement of the coupling means; and commanding desired performance of the power delivery system during the full power phase by reducing the transmission ratio to command an increase in power output and increasing the transmission ratio to command a reduction in power output.

64. A method according to claim 63 wherein the step of commanding desired performance during the partial power phase includes maintaining the transmission at a substantially constant high reduction ratio.

65. A method according to claim 63 wherein said fuel function is the ideal operating line for minimum fuel consumption.

66. A method according to claim 63 wherein the prime mover is the engine of an engine-driven vehicle.

67. A method according to claim 66 wherein the engine is an internal combustion engine.

68. A method according to claim 67 wherein the step of commanding desired performance during the partial power phase includes maintaining the transmission at a substantially constant high reduction ratio.

69. A method according to claim 67 wherein said fuel function is the ideal operating line for minimum fuel consumption.

70. A method according to claim 63 or 67 wherein said fuel function defines desired fuel requirements as a function of prime mover operating speed and measured fuel flow.

71. A method according to claim 70 wherein said fuel function is given by $$-K(N_E-h(\theta))$$

where
K = a constant,
$N_E$ = prime mover operating speed,
$\theta$ = measured fuel flow, and
$h(\theta)$ = a function of measured fuel flow.

72. A method according to claim 63 or 67 wherein said fuel function prescribes that the prime mover operate substantially at constant speed.

73. A method according to claim 72 where said fuel function prescribes that the prime mover operate substantially at the no-load idle speed thereof.

74. A method according to claim 73 wherein said fuel function defines a rate of change of fuel flow and is given by $$-K(N_E-NIDLE)$$

where
K = a constant,
$N_E$ = prime mover operating speed, and
NIDLE = prime mover no-load idle speed.

75. A method according to claim 63 or 67 wherein said fuel function prescribes that the prime mover operate at or below the no-load idle speed thereof.

76. A method according to claim 75 wherein said fuel function is given by $$-K(N_E-NIDLE)$$

where
K = a constant,
$N_E$ = prime mover operating speed, and
NIDLE = prime mover no-load idle speed.

77. A system for controlling the partial low power operation of a power delivery system including a prime mover having fuel delivery means for delivering a variable quantity of fuel thereto, a continuously variable ratio transmission, and variably engageable coupling means for variably coupling and delivering power from the power delivery system to an output shaft, the partial low power operation occurring when the coupling means is less than fully engaged, the control system comprising:

speed measuring means for measuring the speed of the prime mover;

fuel function means defining desired fuel requirements for the prime mover in relation to at least prime mover operating speed, said fuel function prescribing an increased fuel flow for a decrease in measured operating speed and a reduced fuel flow for an increase in measured operating speed;

fuel control means operatively coupled to the fuel delivery means and to said speed measuring means and said fuel function means for controlling the fuel delivery means only in accordance with said fuel function, whereby the speed of the prime mover is regulated in accordance with the load placed thereon; and command means operatively coupled to the coupling means for commanding desired performance of the power delivery system by varying the degree of engagement of the coupling means.

78. A system according to claim 77 wherein said command means is operatively coupled to the transmission and maintains the transmission at a substantially constant high reduction ratio.

79. A system according to claim 77 wherein said fuel function is the ideal operating line for minimum fuel consumption.

80. A system according to claim 77 wherein the prime mover is the engine of an engine-driven vehicle.

81. A system according to claim 80 wherein the engine is an internal combustion engine.

82. A system according to claim 81 wherein said command means is operatively coupled to the transmission and maintains the transmission at a substantially constant high reduction ratio.

83. A system according to claim 81 wherein said fuel function is the ideal operating line for minimum fuel consumption.

84. A system according to claim 77 or 81 wherein said fuel function defines desired fuel requirements as a function of prime mover operating speed and measured fuel flow.

85. A system according to claim 84 wherein said fuel function is given by $$-K(N_E-h(\theta))$$

where
K = a constant,
$N_E$ = prime mover operating speed,
$\theta$ = measured fuel flow, and
$h(\theta)$ = a function of measured fuel flow.

86. A system according to claim 77 or 81 wherein said fuel function prescribes that the prime mover operate substantially at constant speed.

87. A system according to claim 86 where said fuel function prescribes that the prime mover operate substantially at the no-load idle speed thereof.

88. A system according to claim 87 wherein said fuel function defines a rate of change of fuel flow and is given by $$-K(N_E - NIDLE)$$

where
K = a constant,
$N_E$ = prime mover operating speed, and
NIDLE = prime mover no-load idle speed.

89. A system according to claim 77 or 81 wherein said fuel function prescribes that the prime mover operate at or below the no-load idle speed thereof.

90. A system according to claim 89 wherein said fuel function is given by $$-K(N_E - NIDLE)$$

where
K = a constant,
$N_E$ = prime mover operating speed, and
NIDLE = prime mover no-load idle speed.

91. A system for controlling the low power operation of a power delivery system including a prime mover having fuel delivery means for delivering a variable quantity of fuel thereto, a continuously variable ratio transmission, and variably engageable coupling means for variably coupling and delivering power from the power delivery system to an output shaft, the low power operation consisting of a partial power phase during which the coupling means is less than fully engaged, and a full power phase during which the coupling means is fully engaged, the control system comprising:
  speed measuring means for measuring the speed of the prime mover;
  fuel function means defining desired fuel requirements for the prime mover in relation to at least prime mover operating speed, said fuel function prescribing an increased fuel flow for a decrease in measured operating speed and a reduced fuel flow for an increase in measured operating speed;
  fuel control means operatively coupled to the fuel delivery means and to said speed measuring means and said fuel function means for controlling the fuel delivery means only in accordance with said fuel function, whereby the speed of the prime mover is regulated in accordance with the load placed thereon; and
  command means operatively coupled to the transmission and the coupling means for commanding desired performance of the power delivery system by:
    (a) during the partial power phase, varying the degree of engagement of the coupling means; and
    (b) during the full power phase, reducing the transmission ratio to increase power output and increasing the transmission ratio to reduce power output.

92. A system according to claim 91 wherein said command means maintains the transmission at a substantially constant high reduction ratio during the partial power phase.

93. A system according to claim 91 wherein said fuel function is the ideal operating line for minimum fuel consumption.

94. A system according to claim 91 wherein the prime mover is the engine of an engine-driven vehicle.

95. A system according to claim 94 wherein the engine is an internal combustion engine.

96. A system according to claim 95 wherein said command means maintains the transmission at a substantially constant high reduction ratio during the partial power phase.

97. A system according to claim 95 wherein said fuel function is the ideal operating line for minimum fuel consumption.

98. A system according to claim 91 or 95 wherein said fuel function defines desired fuel requirements as a function of prime mover operating speed and measured fuel flow.

99. A system according to claim 98 wherein said fuel function is given by $$-K(N_E - h(\theta))$$

where
K = a constant,
$N_E$ = prime mover operating speed,
$\theta$ = measured fuel flow, and
$h(\theta)$ = a function of measured fuel flow.

100. A system according to claim 91 or 95 wherein said fuel function prescribes that the prime mover operate substantially at constant speed.

101. A system according to claim 100 where said fuel function prescribes that the prime mover operate substantially at the no-load idle speed thereof.

102. A system according to claim 101 wherein said fuel function defines a rate of change of fuel flow and is given by $$-K(N_E - NIDLE)$$

where
K = a constant,
$N_E$ = prime mover operating speed, and
NIDLE = prime mover no-load idle speed.

103. A system according to claim 91 or 95 wherein said fuel function prescribes that the prime mover operate at or below the no-load idle speed thereof.

104. A system according to claim 103 wherein said fuel function is given by $$-K(N_E - NIDLE)$$

where
K = a constant,
$N_E$ = prime mover operating speed, and
NIDLE = prime mover no-load idle speed.

* * * * *